US008397221B2

(12) United States Patent
Gulwani et al.

(10) Patent No.: US 8,397,221 B2
(45) Date of Patent: Mar. 12, 2013

(54) CALCULATING RESOURCE BOUNDS OF PROGRAMS MANIPULATING RECURSIVE DATA STRUCTURES AND COLLECTIONS

(75) Inventors: Sumit Gulwani, Redmond, WA (US); Krishna Kumar Mehra, Bangalore (IN); Trishul A Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 12/247,034

(22) Filed: Oct. 7, 2008

(65) Prior Publication Data

US 2010/0088684 A1  Apr. 8, 2010

(51) Int. Cl.
*G06F 9/44* (2006.01)
*G06F 9/45* (2006.01)
(52) U.S. Cl. ......... 717/143; 717/130; 717/131; 717/158
(58) Field of Classification Search .................. None
See application file for complete search history.

(56) References Cited

U.S. PATENT DOCUMENTS

| 5,828,883 | A | 10/1998 | Hall |
| 6,539,541 | B1 | 3/2003 | Geva |
| 6,681,385 | B1 | 1/2004 | Steensgaard et al. |
| 6,832,370 | B1 | 12/2004 | Srinivasan et al. |
| 7,039,919 | B1 * | 5/2006 | Hunt .............................. 719/316 |
| 7,574,695 | B2 | 8/2009 | Chander et al. |
| 7,730,455 | B2 | 6/2010 | Chander et al. |
| 2002/0010911 | A1 | 1/2002 | Cheng et al. |
| 2004/0148150 | A1 * | 7/2004 | Ashar et al. .................... 703/14 |
| 2006/0048122 | A1 | 3/2006 | Barton et al. |

OTHER PUBLICATIONS

Gulwani et al., "Bounding Resource Consumption Using Abstract Interpretation," presented May 10, 2007 at OSQ Retreat organized by University of California Berkeley, 5 pages.
Gustafsson et al., "Automatic Derivation of Loop Bounds and Infeasible Paths for WCET Analysis using Abstract Execution," Proceedings of the 27th IEEE International Real-Time Systems Symposium (RTSS'06), Dec. 2006, 10 pages.

* cited by examiner

*Primary Examiner* — Chuck Kendall
(74) *Attorney, Agent, or Firm* — Lee & Hayes, PLLC (57) ABSTRACT

Bounding resource consumption of code that processes recursive data structures and collections includes making use of quantitative functions (based on user input) that are associated with a tuple of data-structures and whose semantics is specified by describing the effect of various data-structure methods on the relevant quantitative functions. Counter variables are incorporated into source code to count loop iterations (and number of recursive procedure call invocations). Relevant quantitative functions are incorporated into the source code to allow computation of invariants (and hence bounds) on the incorporated counter variables in terms of the quantitative functions.

20 Claims, 11 Drawing Sheets

| List Operation | Effect on Quantitative Functions |
|---|---|
| $e := L.Head()$ | Assume$(e = null \Rightarrow Len(L) = 0)$; Assume$(e \neq null \Rightarrow Len(L) > 0)$; Pos$(e, L) := 0$; |
| $e := L.Tail()$ | Assume$(e = null \Rightarrow Len(L) = 0)$; Assume$(e \neq null \Rightarrow Len(L) > 0)$; Pos$(e, L) := Len(L) - 1$; |
| $t := L.IsEmpty()$ | Assume$(t = true \Rightarrow Len(L) = 0)$; Assume$(t = false \Rightarrow Len(L) > 0)$ |
| $e1 := L.GetNext(e2)$ | Pos$(e1, L) := $ Pos$(e2, L) + 1$; Assume$(0 \leq $ Pos$(e2, L) < Len(L))$; |
| $e1 := L.GetPrevious(e2)$ | Pos$(e1, L) := $ Pos$(e2, L) - 1$; Assume$(0 \leq $ Pos$(e2, L) < Len(L))$; |
| $L.RemoveHead()$ | if$(Len(L) > 0)$ { Len$(L) := Len(L) - 1$; Pos$(e', L) := $ Pos$(e', L) - 1$; |
| $L.Remove(e)$ | Len$(L) := Len(L) - 1$; if$($Pos$(e, L) < $ Pos$(e', L))$ Pos$(e', L) := $ Pos$(e', L) - 1$; |
| $L.Insert(e)$ | Len$(L) := Len(L) + 1$; Pos$(e', L) := $ Pos$(e', L) + 1$; Pos$(e_i, L) := 0$; |
| $L.Append(e)$ | Len$(L) := Len(L) + 1$; Pos$(e, L) := Len(L) - 1$; |
| $L.Splice(L')$ | Len$(L) := Len(L) + Len(L')$; Len$(L') := 0$; Pos$(e, L)$ |
| $L_1.MoveTo(e, L_2)$ | Len$(L_1) := Len(L_1) - 1$; Len$(L_2) := Len(L_2) + 1$; Pos$(e, L_2) := 0$; Pos$(e', L_2) := $ Pos$(e', L_2) + 1$; if$($Pos$(e, L_1) < $ Pos$(e', L_1))$ Pos$(e', L_1) := $ Pos$(e', L_1) - 1$; |

| | Some looping patterns over lists (from Microsoft product code) | Loop Invariant | Complexity |
|---|---|---|---|
| 1. | for $(e := f; e \neq null; e := L.GetNext(e))$: | $c = $ Pos$(e, L)$-Pos$(f, L) \land $ Pos$(e, L) \leq Len(L)$ | $Len(L) - $ Pos$(f, L)$ |
| 2. | for $(; !L.IsEmpty(); L.RemoveHead())$: | $c = $ Old$(Len(L)) - Len(L) \land Len(L) \geq 0$ | Old$(Len(L))$ |
| 3. | for $(e := L.Head(); e \neq null;$ $tmp := e; e := L.GetNext(e); $ if $(*)$ $L.Remove(tmp))$: | $c = $ Pos$(e, L) + $ Old$(Len(L)) - Len(L) \land$ Pos$(e, L) \leq Len(L)$ | Old$(Len(L))$ |
| 4. | ToDo.Init(); Done.Init(); L.MoveTo(L.Head(), ToDo); while (!ToDo.IsEmpty()) $e := $ ToDo.Head(); ToDo.RemoveHead(); Done.Insert$(e)$; foreach successor $s$ in $e$.Successors() if $(L$.contains$(s))$ $L$.MoveTo$(s, ToDo)$; | $c_1 \leq $ Old$(Len(L)) - Len(Done) - Len(ToDo)$ $\land c_1 = Len(Done) \land Len(L) \geq 0 \land$ $Len(ToDo) \geq 0$ | Old$(Len(L))$ |
| | for $(e := Done.Head(); e \neq null; e := Done.GetNext(e))$: | $c_2 \leq $ Pos$(e, Done) \land $ Pos$(e, Done) \leq Len(Done))$ $\land Len(Done) \leq $ Old$(Len(L))$ | Old$(Len(L))$ |

FIG. 5B

| | List Operation | Effect on Quantitative Functions |
|---|---|---|
| 1. | $e := L.Head()$ | Assume($e$ = null $\Rightarrow$ Len($L$) = 0); Assume($e \neq$ null $\Rightarrow$ Len($L$) > 0); Pos($e,L$) := 0; TotalPos($e,L$) := 0; Assume(Len($e$) $\leq$ MaxNodes($L$)); Owner($e$) := $L$; |
| 2. | $t := L.IsEmpty()$ | Assume($t$ = true $\Rightarrow$ TotalNodes($L$) = 0 $\wedge$ MaxNodes($L$) = 0); Assume($t$ = false $\Rightarrow$ TotalNodes($L$) > 0); |
| 3. | $e1 := L.GetNext(e2)$ | TotalPos($e1,L$) := TotalPos($e2,L$) + Len($e2$); Assume(TotalPos($e1,L$) $\leq$ TotalNodes($L$)); Assume(Len($e1$) $\leq$ MaxNodes($L$)); Owner($e1$) := $L$; |
| 4. | $L.Remove(e)$ | TotalNodes($L$) := TotalNodes($L$) - Len($e$); {int $tmp$ := MaxNodes($L$); MaxNodes($L$) :=?; Assume(MaxNodes($L$) $\leq tmp$);} if (Pos($e,L$) < Pos($e',L$)) TotalPos($e',L$) := TotalPos($e',L$) - Len($e$); |
| 5. | $L.Insert(e)$ | TotalNodes($L$) := TotalNodes($L$) + Len($e$); MaxNodes($L$) := Max(MaxNodes($L$), Len($e$)); TotalPos($e',L$) := TotalPos($e',L$) + Len($e$); TotalPos($e,L$) := 0; Owner($e$) := $L$; |
| 6. | $e.Remove(f)$ | TotalNodes(Owner($e$)) := TotalNodes(Owner($e$))-1; if (*) MaxNodes(Owner($e$)):=MaxNodes(Owner($e$))-1; if (Pos($e$,Owner($e$)) < Pos($e'$,Owner($e$))) TotalPos($e'$,Owner($e$)) := TotalPos($e'$,Owner($e$)) - 1; |

FIG. 6

BIT-VECTOR EXAMPLE

```
Iterate (unsigned int a) {
1   b := a;
2   while (_BitScanForward(&id1, b))
3       b := b | ((1 << id1) - 1);  //set all bits before id1
4       if (_BitScanForward(&id2, ~ b)) break;
5       b := b &  (~((1<< id2) - 1));  //reset bits before id2
6   }
```

DEFINE AND INSTRUMENT QUANTITATIVE FUNCTIONS FOR RECURSIVE
DATA STRUCTURES AND COLLECTIONS USING INPUT DATA
1102

INTRODUCE MULTIPLE COUNTER VARIABLES IN PROGRAM CODE
BASED ON A PROOF STRUCTURE
1104

COMPUTE INVARIANTS RELATING THE COUNTER VARIABLES WITH
QUANTITATIVE FUNCTIONS DEFINED
1106

CALCULATE LINEAR BOUNDS BASED ON THE INVARIANTS AND THE
COUNTER VARIABLES
1108

COMPOSE BOUNDS TOGETHER BASED ON THE PROOF STRUCTURE
TO GENERATE A TOTAL RESOURCE BOUND FOR THE CODE
1110

CALCULATING RESOURCE BOUNDS OF PROGRAMS MANIPULATING RECURSIVE DATA STRUCTURES AND COLLECTIONS

REFERENCE TO RELATED APPLICATION

This application relates to the subject matter of U.S. patent application Ser. No. 12/115,435, filed May 5, 2008, which is incorporated in its entirety by reference herein.

BACKGROUND

Modern software development has embraced modular design and data abstraction. While this increases programmer productivity by enabling code reuse, it potentially creates additional performance problems. Examples include hidden algorithmic complexity where a linear-time algorithm encapsulated inside a simple application programming interface (API) call gives rise to quadratic complexity, when embedded inside an iterative loop. Software performance testing attempts to address these issues but faces two fundamental limitations—it is often too little or too late. First, due to resource constraints, a program is typically tested on only a small subset of its inputs and the performance problem may not manifest on these inputs. Second, these performance tests are time consuming and are typically only run periodically for large software projects. Consequently, many performance problems show up very late in the software development process when it is hard to redesign or re-architect the system to fix the problem correctly, or even worse, after software ships.

One difficulty encountered in computing complexity bounds is bounding the total number of loop iterations or recursive procedure call invocations. This is even more difficult for loops that iterate over abstract data-structures. In these cases, numerical functions over the data-structures may be used to express bounds, e.g., length of a list, height of a tree, etc. However, computing complexity bounds in these cases often requires sophisticated shape analysis, which involves understanding the shape/layout/reachability-pattern of a given data-structure, which in turn requires a sophisticated alias analysis that is known to be a hard problem.

SUMMARY

This summary introduces simplified concepts of bounding resource consumption for code using abstract interpretation, which is further described below in the Detailed Description.

This application describes generation of quantitative functions to compute program execution bounds for programs that operate over recursive data structures and collections. In one aspect, a method includes identifying a quantitative function to associate with a tuple of a data structure, and then specifying the semantics of the quantitative function by describing the effects on the quantitative function resulting from the execution of various methods associated with the relevant data structures.

In another aspect, a method generates invariants over quantitative functions. The method includes instrumenting an invocation of a method associated with a data structure with the effects on the quantitative functions (associated with that data-structure) resulting from the execution of that method. Then, multiple counter variables to count loop iterations (or recursive procedure call invocations) are introduced in the program code, based on a proof structure. Finally, the invariants are computed based on the instrumented semantics and the counter variables.

In yet another aspect, a method statically computes a bound on a resource utilized during execution of program code. The method includes defining one or more quantitative functions, and instrumenting the quantitative functions into the program code. Multiple counter variables to count loop iterations are introduced into the program code, based on a proof structure. Locations are selected to initialize the counter variables to zero, and to increment each counter variable by one. An invariant is computed relating the counter variables with the quantitative functions. Bounds on the counter variables are calculated from the invariant. These bounds are composed together to obtain a final desired bound.

This summary is provided to introduce a selection of concepts in a simplified form to be further described below in the Detailed Description. This summary is not intended to identify key features or essential features of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 6 presents a table showing a number of examples of list operations to update example quantitative functions associated with list-of-lists.

FIG. 11 illustrates an exemplary method of calculating resource bounds in the presence of recursive data structures and collections using a proof structure.

DETAILED DESCRIPTION

Overview

This disclosure describes techniques of using abstract interpretation for computing resource consumption bounds of code, when implementation of the code includes recursive data structures and collections. The techniques describe using static analysis to compute symbolic complexity bounds for procedures in terms of their inputs. The techniques can be used to provide useful insights into how a module performs as a function of its inputs at an abstract level, and can produce early warnings about potential performance issues. The same analysis can also be used for bounding other kinds of resources (e.g., memory, timing resources, number of files opened, number of threads created, and the like) consumed by a procedure.

Resource bounds can correspond to any of several kinds of resources consumed by code. For example, the resource may be time taken by the code to execute, an amount of memory allocated by the code, an operating system resource such as the number of file handles or locks, an available network bandwidth used, or any other resource used by the code. Knowing the resource bounds can help a developer or tester of a software application to estimate the maximum job size that the software application can handle. Knowing the maximum job size that the software application can handle may help in configuring a smooth termination of the application, without causing it to hang or crash if the required resources are not available. The maximum job size value can also help in correctly estimating time taken to execute the software application, hardware resources required, etc.

An exemplary methodology includes instrumenting monitor variables (henceforth referred to as counter variables) to count the number of loop iterations (or recursive procedure call invocations), and then statically computing a bound on these counter variables in terms of program inputs using an invariant generation tool.

In some cases, given a powerful invariant generation oracle, it is sufficient to instrument a single counter variable, which is initialized to 0 at the beginning of a procedure and is incremented by 1 at each back-edge, and then use the invariant generation oracle to compute bounds on the counter variable. However, even for a simple program, such an approach would require the invariant generation tool to be able to compute invariants that are disjunctive, non-linear, and that can characterize sophisticated heap shapes. No such invariant generation tool is known to exist, and even if it did, it would likely not be scalable.

An exemplary two-tiered approach may be used to address the above challenges. First, multiple counters are introduced, each of which may be initialized and incremented at multiple locations. This avoids the need for disjunctive and non-linear invariants. Second, quantitative functions are defined over abstract data-structures. This avoids the need for sophisticated shape analysis. In one example, the quantitative functions are defined based at least in part on user input. In another example, the quantitative functions may be defined automatically. For ease of discussion, and without precluding other alternatives, quantitative functions defined based on user input are described in the examples and explanations below.

A proof methodology based on multiple counter instrumentation may be used to introduce multiple counters into product code. Each counter can be initialized and incremented at potentially multiple program locations within the code. The introduction of these counters allows a given linear invariant generation tool to compute linear bounds individually on these counter variables. The bounds on these counters may then be composed together to generate total bounds that are non-linear and disjunctive. In one example, an algorithm is used for automating this proof methodology to generate precise complexity bounds.

Next in this example, quantitative functions are defined, automatically or based on human input, that can be associated with abstract data-structures in the code of interest; e.g., length of a list, height of a tree, etc. Each of these quantitative functions is a numeric function over some tuple of data-structures. The semantics of these functions is specified by annotating each data-structure method with how it may update certain quantitative functions. Bounds may be computed in terms of these quantitative functions using a linear invariant generation tool that has support for handling uninterpreted functions. This methodology may be applied to various data-structures, for example lists, lists of lists, trees, bit-vectors, and the like. A small number of quantitative functions for each data-structure may be sufficient to allow generation of symbolic complexity bounds for a variety of loops that iterate over these data-structures. The process to define these quantitative functions is discussed below.

The combination of these techniques enables generation of precise computational complexity bounds, for some of which it is non-trivial to even prove termination. Such bounds are very useful for early detection of performance problems in large modular codebases that are being changed by multiple developers.

Note that the technique described for estimating computational complexity does not assume program termination. Instead, existence of an upper bound on the number of loop iterations provides a free termination argument and may even yield a simpler and more efficient alternative to termination strategies pursued in other methodologies, which rely on synthesizing ranking functions for loops.

Multiple and varied implementations and embodiments are described below. In the following section, an exemplary environment that is suitable for practicing various implementations is described. After this discussion, representative implementations of systems, devices, and processes for bounding resource consumption for code using abstract interpretation in the presence of recursive data structures and collections are described.

Exemplary Architecture

Figure 1:
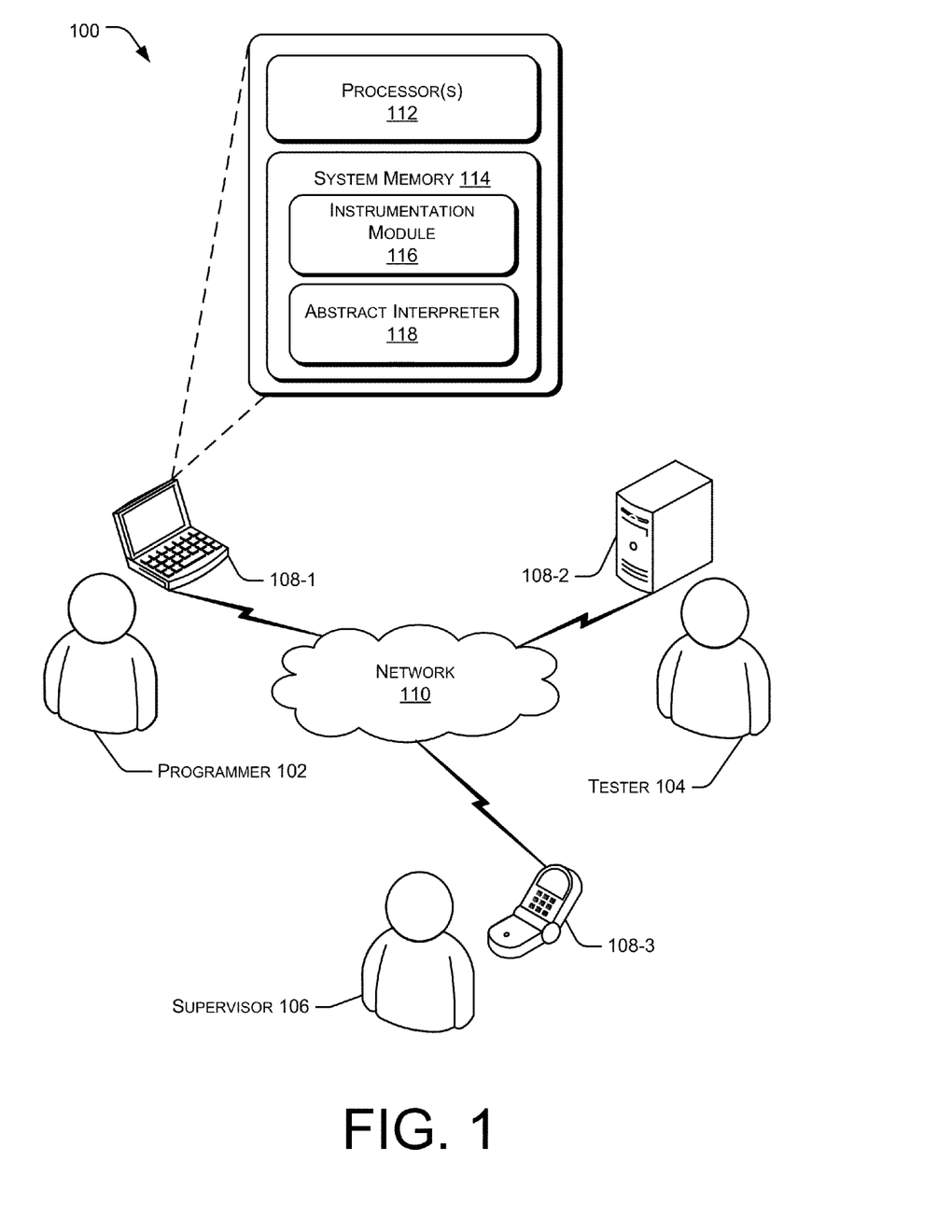
FIG. 1 illustrates an exemplary environment suitable for calculation of bounds of resource consumption for code using abstract interpretation.

FIG. 1 illustrates an exemplary environment 100 suitable for calculation of bounds of resource consumption for code using abstract interpretation. For discussion purposes, the environment 100 is configured to receive input from a human developer 102, a tester 104, and a supervisor 106. In other implementations, a computer or other device may automatically perform some or all of the functions performed by the developer 102, tester 104, and supervisor 106.

Typically, the developer 102 writes a set of instructions, also referred to as source code, which when executed demonstrate an expected behavior for a software application. The tester 104, on other hand, tests the software application for its compliance with an expected functionality. Both, the developer 102 and the tester 104 can estimate bounds on different kinds of resources consumed by the code. The supervisor 106 can monitor the code and the respective resource bounds to check for code compliance.

The developer 102, the tester 104, and the supervisor 106 communicate with each other through one or more devices 108-1, 108-2, . . . 108-n, collectively referred to as devices 108, through a network 110.

Each device 108 may be implemented as a variety of conventional computing devices including, for example, a server, a desktop PC, a notebook or portable computer, a workstation, a mainframe computer, a mobile computing device, an Internet appliance, a network router, etc. or a combination thereof that are configurable to bound resource consumption for the code based on abstract interpretation.

The network 110 may be a wireless or a wired network, or a combination thereof. The network 110 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 108 includes a processor 112 coupled to a memory 114. The memory 114 includes an instrumentation module 116 and an abstract interpreter 118. The memory 114 may be coupled to or associated with, and/or accessible to other devices, such as network servers, router, and/or other devices 108.

The instrumentation module 116 incorporates one or more counter variables in the code to estimate bounds on the number of loop iterations and recursive procedure call invocations. The instrumentation module 116 initializes the counter variables at appropriate locations in the source code. Further, the instrumentation module 116 instruments an increment to the counter variables at specific locations inside the code. The instrumentation module also creates copies of those program inputs modified inside the code.

The abstract interpreter 118 then computes bounds relative to the counter variables. To do this, the abstract interpreter first computes invariants relating the instrumented counter variables with defined quantitative parameters of recursive data structures and collections. The resulting invariants are then used to obtain bounds on resources consumed by execution of the program code.

Figure 2:
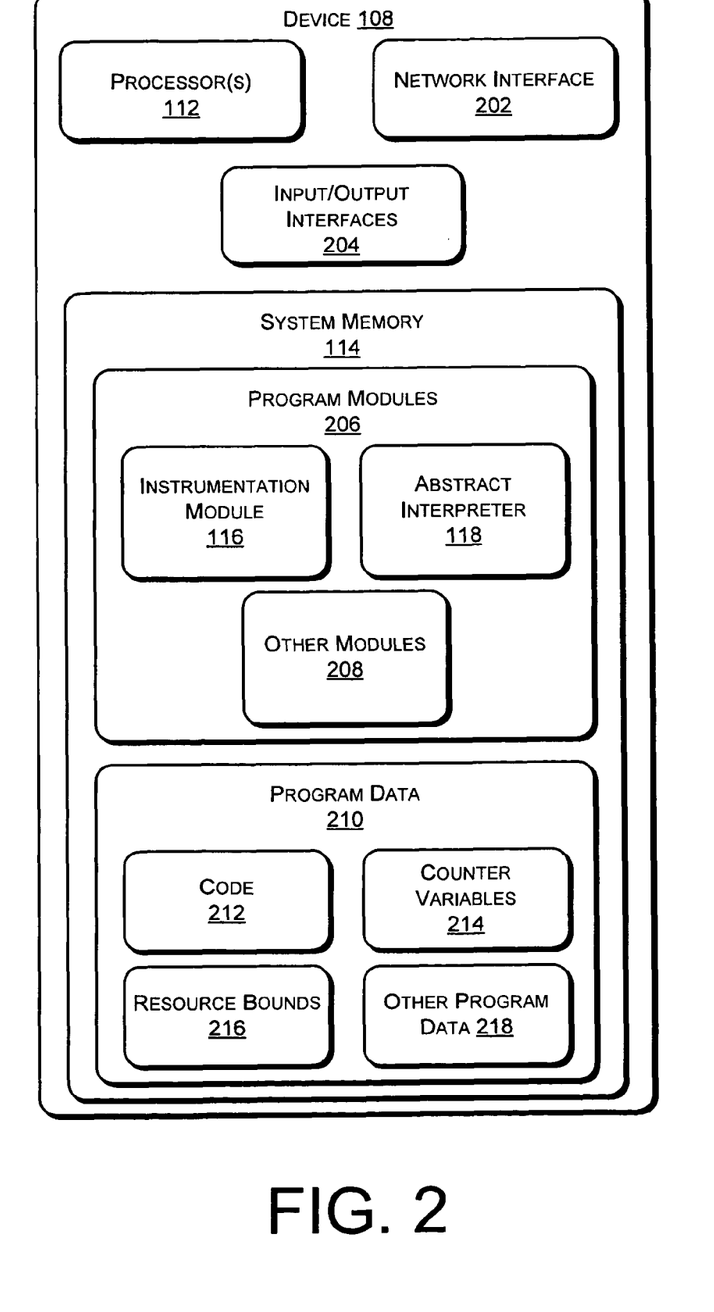
FIG. 2 illustrates an exemplary computing device for bounding resource consumption using abstract interpretation.

FIG. 2 illustrates various components of an exemplary device 108. In one embodiment, the device 108 can include, but is not limited to, a processor 112, a network interface 202, a system memory 114, and an input/output interface 204.

The network interface 202 may enable the device 108 to receive a software application's code and share the results of the computation of resource bounds over the network 104. For example, the supervisor 106 can monitor both the code and the computational complexity of the code over the network interface 202.

The memory 114 includes a computer-readable media in the form of volatile memory, such as Random Access Memory (RAM) and/or non-volatile memory, such as read only memory (ROM) or flash RAM. The memory 114 typically includes data and/or program modules for implementing calculation of bounds on resource consumption that are immediately accessible to and/or presently operated on by the processor 112. In one embodiment, the memory 114 includes the instrumentation module 116 the abstract interpreter 118, and other modules 208. The other modules 208 may include other software that assists in the functioning of the computing device 108, such as an operating system. The memory 114 may also include program data 210 that may further include code 212, one or more counter variables 214, one or more resource bounds 216, and other data 218 specific to the system or the applications.

The instrumentation module 116 introduces one or more counter variables 214 in the code 212 to count the number of loop iterations or recursive procedure call invocations during the execution of the code 212. In one implementation, the instrumentation module 116 initializes one or more counter variables 214 at locations in the code 212. The initialization of the counter variables 214 can include setting values of the counter variables 214 to a start value, such as zero.

Figure 3:
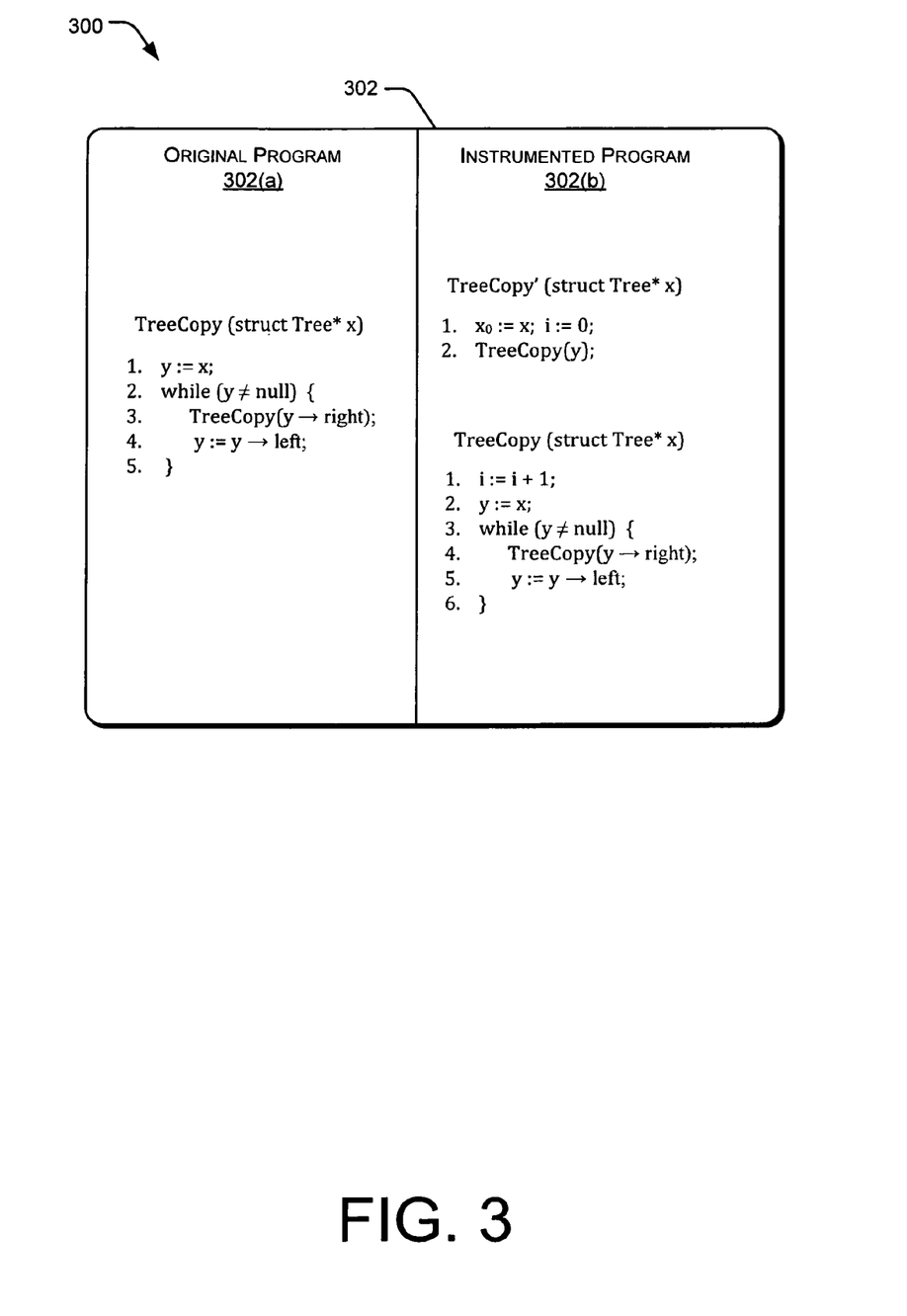
FIG. 3 presents an exemplary counter instrumentation of source code for bounding resource consumption using base quantitative parameters to compute precise complexity bounds.

FIG. 3 shows an illustration of instrumenting counter variables in a portion of code for a recursive procedure call 302, which includes the original program shown at 302(a) and an instrumented version of the same program shown at 302(b). The instrumentation module 116 initializes the counter variable i in the procedure initially to zero. The instrumentation module 116 instruments an increment of the counter variable in the program at program location 1.

Once the counter variables 214 have been instrumented, the abstract interpreter module 118 computes bounds on the number of loop iterations or recursive procedure call invocations.

Computing precise bounds in the presence of recursive data structures generally requires sophisticated shape analysis to compute invariants. Also generally required is data structure-specific information about "interesting" attributes of the data structure, such as the height of a tree or the maximal length of a list in a hash table implemented as an array of lists. Such data structure-specific attribute information is generally hard to infer automatically. To avoid these issues, quantitative functions relative to abstract data structures may be defined based on user input. The quantitative functions created are used as discussed below.

While various discreet embodiments are described, the individual features of the various embodiments may be combined or modified to form other embodiments not specifically described.

Basic Methodology

An example of a methodology for automating proof arguments for computing timing bounds involves the methods described below.

First, quantitative/numerical functions are defined for data-structures. In an example, a user inputs data declaring some numerical-valued functions over data-structures, for example, length of a list, or height of a tree. The semantics of these functions may be defined by annotating each data-structure method with its effect on the numerical functions associated with relevant data-structures. For example, the delete method associated with a list reduces its length by 1. For purpose of communicating the semantics of these functions to an invariant generation tool (used in the next step), each invocation of a data-structure method is instrumented with its effect on the quantitative functions as defined. This allows for treating the quantitative function as an uninterpreted function, which eases up the task of an invariant generation tool.

Next, a proof structure is generated. This corresponds to choosing a set of counter variables, and for each counter variable selecting locations at which to initialize it to 0 and locations at which to increment it by 1. The counters are chosen such that the given invariant generation tool can compute bounds on the counter variables at appropriate locations in terms of the scalar inputs and quantitative functions of input data-structures. For example, a linear invariant generation tool that supports handling uninterpreted functions to generate these bounds may be used.

Finally, the bounds on counter variables are composed to obtain the final desired bound.

Obtaining a proof structure involves choosing a set of fresh counter variables S, and for each counter variable, deciding the locations (from among the back-edges or procedure entry point) to initialize the counter variable to 0, and determining the back-edges to increment the counter variable by 1. Additionally, the following conditions are observed:

Each back-edge q should be instrumented with an increment to some counter variable (denoted by M(q)).

There should be no cyclic dependencies between counter variables. A counter variable $c_1$ is said to depend on another counter variable $c_2$ if $c_1$ is initialized to 0 at a back-edge where $c_2$ is incremented by 1.

The invariant generation tool is able to provide a symbolic bound B(q) at each back-edge q on the counter variable M(q) in terms of the inputs to the procedure.

A proof structure for a procedure P is defined as follows. Let S be a set of counter variables and let M be a function that maps each back-edge in P to some counter variable from set S. Let G be any directed acyclic graph (DAG) structure over S ∪ {r} with r as the unique root node. Let B be a function that maps each back-edge in P to some symbolic bound over inputs of P. Then, the tuple (S, M, G, B) is a proof-structure (with respect to a given invariant generation tool) if for all back-edges q in procedure P, the given invariant generation tool can be used to establish bound B(q) on counter variable M(q) at q in the procedure Instrument(P, (S, M, G)).

Procedure Instrument(P, (S, M, G)) is then defined as follows. Let P be some given procedure. We define Instrument(P, (S, M, G)) to be the procedure obtained from P by instrumenting it as follows:

Each back-edge q in P is instrumented with an increment (by 1) to counter variable M(q).

Each back-edge q in P is instrumented with an initialization (to 0) of any counter variable c' that is an immediate successor of M(q) in G, i.e., (M(q),c') is an element of G.

The procedure entry point is instrumented with an initialization (to 0) of any counter variable c' that is an immediate successor of the root node r in G, i.e., (r, c') is an element of G.

Theorem 1 shown below describes how to compose bounds on counters to obtain a bound on the number of loop iterations, given a proof structure. Note that this process introduces disjunctions and non-linearity in the computation of bounds on loop iterations.

THEOREM 1 (Bound on Loop Iterations). Let (S, M, G, B) be a proof structure for procedure P. Then, U as defined below, denotes an upper bound on the total number of iterations of all loops in procedure P.

$$U = \sum_{c \in S} TotalBound(c)$$

$$TotalBound(r) = 0$$

$$TotalBound(c) = Max(\{0\} \cup \{B(q) \mid M(q) = c\}) \times \left(1 + \sum_{(c',c) \in G} TotalBound(c')\right)$$

PROOF: TotalBound(c) denotes the sum of the number of traversals of all back-edges q such that M(q)=c. This can be proved by induction on the topological order of the DAG G. The total number of loop iterations is given by the sum of the number of traversals of each back-edge. The result follows from the fact that each back-edge is mapped to a counter.

Counter-Optimal Proof Structure

A procedure may have multiple proof structures. Some proof structures may be better than others in yielding a bound on the total number of loop iterations (as defined above in Theorem 1 above).

This section describes an efficient algorithm for constructing a counter-optimal proof structure. The example algorithm runs in time that, in worst-case, is quadratic in the number of back-edges (modulo of the time taken by the invariant generation tool). In contrast, note that the number of triples (S, M, G) is exponential in the number of back-edges. Hence, a naive full state space search to find any proof structure (S, M, G, B) would be too expensive.

The algorithm strikes a balance between two opposite challenges—minimizing the number of counters while also minimizing the number of dependencies between counters. Introducing more counters and more dependencies between counters increases (not decreases) the ability of an invariant generation tool to generate bounds on counters. It is possible to map each back-edge to a distinct counter, but the algorithm cannot simply make all counters depend on all other counters. This would lead to a cyclic dependency of counters, and G would not be a DAG, and hence (proof of) Theorem 1 would break down. So, the challenge is to find an appropriate set of acyclic dependencies between counters in DAG G.

To generate an exemplary counter-optimal proof structure, the algorithm would use a minimum number of counters, and a minimum number of dependencies between counters. The algorithm for constructing a proof structure (S, M, G, B) for a given procedure P is described in the code shown in FIG. 4 at 400.

Figure 4:
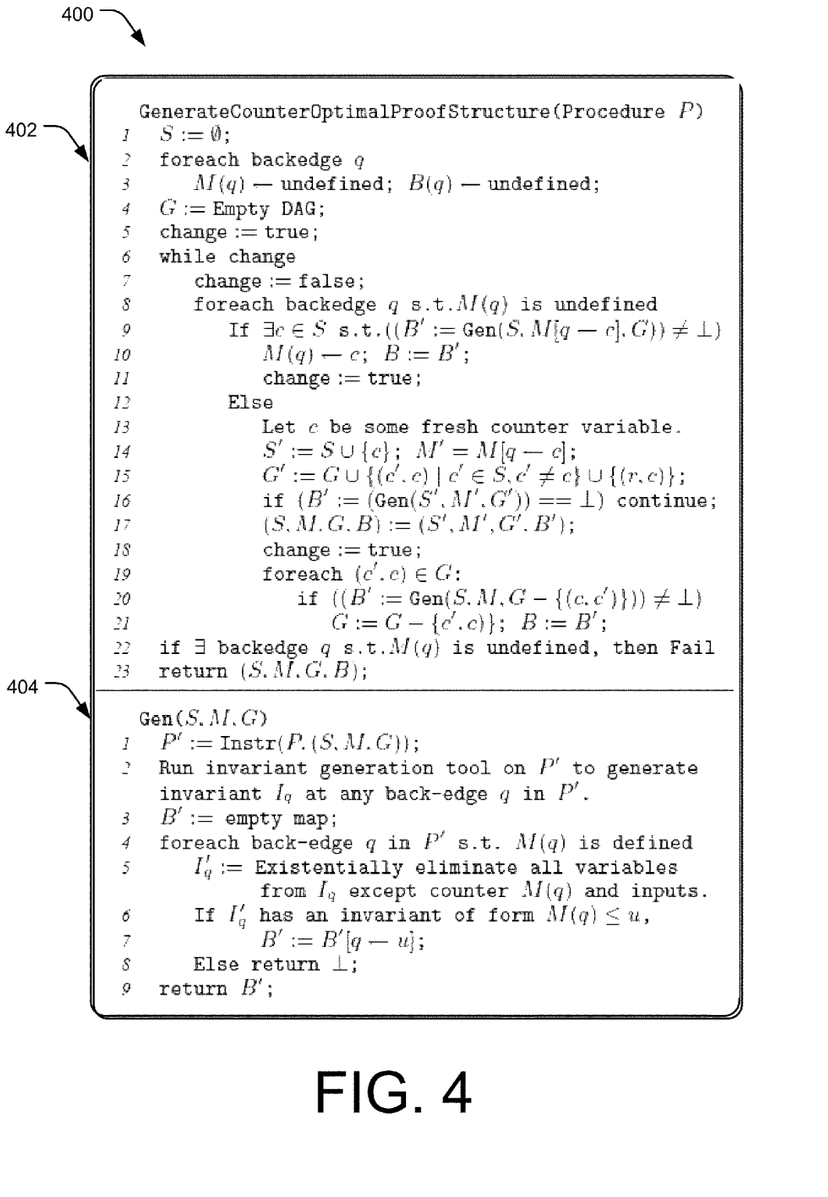
FIG. 4 illustrates an exemplary algorithm for constructing a proof structure for a given procedure.

The process shown in code block 402 is descriptive of the overall process of computing bounds on code procedures iterating over abstract data structures. Each iteration of the loop in Line 8 of code block 402 attempts to map a new back-edge q to a counter. The algorithm of code block 402 first tries to use any existing counter variable (to ensure that the number of counter variables generated are optimal/minimal, which is a requirement for the proof structure to be counter-optimal). If it fails, the algorithm of code block 402 tries to introduce a new counter variable c. The new counter variable c can be introduced in an exponential number of ways, each corresponding to choosing some subset of other existing counters as the immediate predecessors of c in DAG G. This exponential search is avoided by the following two observations: first, creation of an additional dependency preserves the ability of the invariant generation tool to compute bounds; and second, the counter-optimality requirement enforces a minimal number of dependencies between counters.

Lines 17-21 of code block 402 make use of the above two observations to search for minimal dependencies for the new counter by starting with all possible dependencies and then removing them one by one if possible. However, it is possible that even adding all possible dependencies may not be sufficient for the invariant generation tool to compute bounds at back-edge q. In that case, the algorithm postpones the decision of choosing a counter for the back-edge q for a future iteration of the outer loop in line 6 of code block 402.

There might be multiple iterations of the outer loop in line 6 of code block 402 since a back-edge q that could not be mapped to a counter in an earlier iteration of the loop in line 8 of code block 402 may now be mapped to a counter since some new back-edges have been mapped to new counters in an earlier iteration. This allows for initializing the counter corresponding to back-edge q to zero at those back-edges, which in turn, may lead to the generation of a bound at back-edge q by the invariant generation tool.

The function Gen(S, M, G) at code block 404 returns a map B that maps each back-edge q, (s.t. M(q) is defined), to some bound on counter variable M(q) at back-edge q in the procedure Instr(P, (S, M, G)). The bound on counter variable M(q) is obtained by running the invariant generation tool and existentially eliminating the temporary variables from the invariant at q. If no bound could be computed for any such back-edge q, it returns ⊥.

Line 1 of code block 404 instruments defined quantitative functions into the code. Note that these quantitative functions are generally described as being user-defined, in the sense that they are defined based on user input. However, the quantitative functions may be defined by other processes including automated processes. Line 2 of code block 404 runs an invariant generation tool, generating invariants based on the quantitative functions instrumented into the code, as well as counter variables, and inputs to procedures iterating over the abstract data structures. At line 5 of code block 404, all variables are existentially eliminated from the invariants generated, except counter variables and inputs. Finally, lines 8 and 9 return resource complexity bounds, if they exist, on the procedures of interest, based on the invariants generated and the counter variables.

Quantitative Functions Over Data-Structures

In the context of this application, quantitative functions serve two purposes. First, they allow a linear invariant generation tool with support for uninterpreted functions to discover linear bounds over counter variables, in terms of quantitative functions of input data-structures. In this regard, the invariant generation tool need not bother about sophisticated heap shapes. Second, quantitative functions tend to be very readable, since (at least in the case of user-defined quantitative functions) the user herself has input information used to define them. Hence, such user-defined quantitative functions allow the user to get a quick sense of the complexity of a procedure that is otherwise expressible using a sophisticated logical formula over heap shapes.

Each quantitative function is associated with a tuple of abstract data-structures. In some regards, a quantitative function is similar to a ghost field except that a quantitative function can be associated with a tuple of data-structures, while a ghost field is typically associated with a single data-structure.

For example, consider a "List" data-structure that maintains a linked list of objects whose type is ListElement. We can associate a quantitative function Len with a List L (denoting the length of list L), and we can associate a quantitative function Pos with a pair of ListElement e and List L (denoting the position of a list-element e inside list L, if e belongs to L; otherwise it is do not care).

In the process of defining quantitative functions, each method of an abstract data-structure is annotated with how it may affect the quantitative attributes of the input data-structures, and how it determines the quantitative attributes of the output data-structures. This is also described as specifying the syntax of the quantitative functions. These effects are specified in an imperative style by a sequence of (possibly guarded) assignments and assume statements using program syntax. However, quantitative functions, applied to appropriate arguments, may also be used wherever numeric variables can be used. Variables that are in scope at the method declaration level (i.e., the inputs to the method, and the outputs of the method) may be used, with the following relaxation. The use of fresh variables is allowed on the left side of an assignment with the interpretation being that the assignment is for all possible instantiations of that fresh variable. This is allowed because a method may change the quantitative attributes associated with multiple objects that are not in scope when the method is invoked.

Figure 5A:
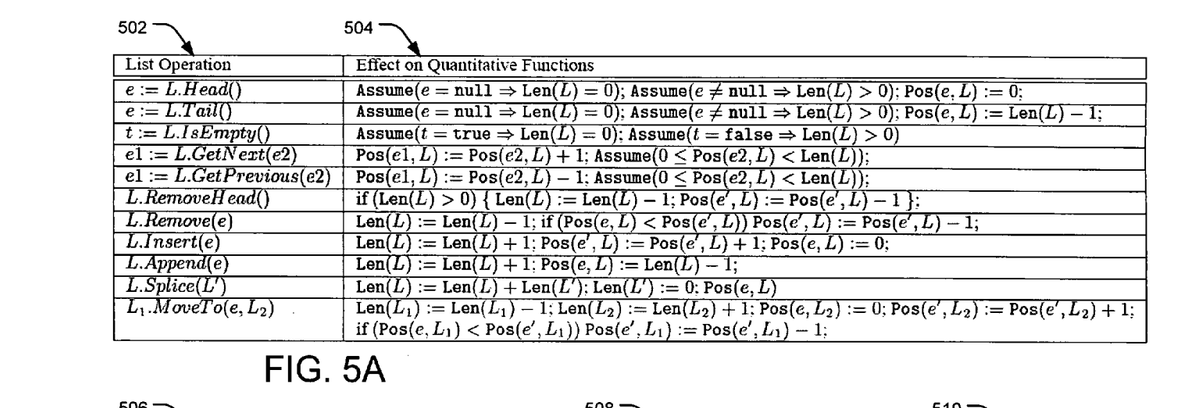
FIG. 5A presents a table showing a number of example list operations and corresponding effects of the operations on some quantitative functions associated with lists.

For example, FIG. 5A illustrates the effects of some List methods on quantitative functions Len and Pos. Column 502 shows a list of List methods. Column 504 shows a specification of the semantics of the operation listed in the corresponding row of column 502 in terms of its effect on the associated quantitative functions. A user may provide such a specification as part of inputting data used to define quantitative functions. In other implementations, however, such a specification may also be performed automatically.

For example, as shown in column 502, the methods L.GetNext(e2), L.GetPrevious(e2), L.Remove(e) all have the precondition that e2 belongs to L. The method L.Insert(e) and L.Append(e) have the precondition that e does not already belong to L. L.Insert(e) inserts e at the front of list L, while L.Append(e) appends e at the end of list L. The method L.splice(L') moves all elements from L' to the end of list L. The method $L_1$.MoveTo(e, $L_2$) removes element e from list $L_1$ and inserts it at beginning of list $L_2$ (and has precondition that e belongs to $L_1$).

Also by way of example, as shown in column 504 with reference to column 502, the effect of method call $L_1$.MoveTo (e, $L_2$) involves decrementing Len($L_1$) and incrementing Len ($L_2$) by 1. Furthermore, inserting an element at the beginning of $L_2$ increases position Pos(e', $L_2$) of all list-elements e' in $L_2$ by 1. This is stated using a free variable e'. Similarly, removal of an element from $L_1$ decreases (by 1) position Pos(e', $L_1$) of all list-elements e'that are after e in L.

Underlying Principles for Defining Quantitative Functions

Defining quantitative functions comprises generating quantitative functions based on user input and/or based on one or more automated processes. There are two principles to be used when generating quantitative functions. The first principle is precision, meaning the precision of the bound result computed for a block of code. In general, defining more quantitative functions increases the possibility that the invariant generation tool will be able to compute a precise bound. However, it is not always necessary to define a large number of quantitative functions. For example, for several commonly used data-structures in the source code of large blocks of Microsoft® product code, including lists, list of lists, bit-vectors, and trees, the number of quantitative functions required for computing bounds was found to be small. In some cases two or three quantitative functions was sufficient to compute a precise bound. In other cases, more quantitative functions may be required.

The second principle to be used in defining quantitative functions is soundness. Whatever quantitative functions are defined, the functions are generally sound from the tool's viewpoint, since the tool takes the semantics of these functions as exactly what the user's input defines them to be. However, since the user has intended semantics for defined functions in her mind, the process depends on the user to conservatively estimate the effect of different methods over the quantitative attributes of different objects with respect to the intended semantics.

Invariant Generation over Quantitative Functions

To allow for invariant generation over quantitative functions, the meaning of the quantitative functions is communicated to the invariant generation tool. This is accomplished by instrumenting each method call with its effect on the quantitative functions of inputs and outputs of the method call. This instrumentation involves substituting the formal inputs and return parameters in the user specification with the actuals at the call site. Assignments that involve free variables in the specification can be handled by instantiating these assignments with all expressions of appropriate type that are live at that program point. However, this potentially expensive and ambitious approach can be avoided by instantiating these assignments during the invariant generation process with those expressions that are present in the invariants computed by the (flow-sensitive) invariant generation tool immediately before the method call site.

The above example of instrumentation allows the quantitative functions to be treated as uninterpreted functions, because the semantics of the functions have been explicitly encoded in the program. Accordingly, a linear invariant generation tool that has been extended with support for uninterpreted functions may be used to compute linear invariants over quantitative functions. Note that aliasing may be taken care of by the uninterpreted functions module that now has to reason whether an update to an uninterpreted function such as $Len(L_1)$ can affect $Len(L_2)$ for example. In one implementation, it reasons this by checking whether it can deduce $L_1 \ne L_2$.

Two techniques that may extend a linear invariant generation tool with support for uninterpreted functions are discussed here. The first technique is an Abstract Interpretation based technique. This technique uses a general mechanism for combining the transfer functions of two given abstract interpreters to generate an abstract interpreter that can discover invariants over a combination of domains. This methodology may be used to combine an abstract interpreter for linear arithmetic with an abstract interpreter for uninterpreted functions.

The second technique that extends a linear invariant generation tool with support for uninterpreted functions is the constraint-based invariant generation technique. This technique describes generating numerical invariants to synthesize invariants expressible in the combined theory of linear arithmetic and uninterpreted function symbols. Unlike fixed-point computation-based techniques like abstract interpretation, constraint-based techniques are goal-directed and do not suffer from precision losses due to widening. However, these advantages come at the cost of programmer specified invariant templates.

Figure 5B:
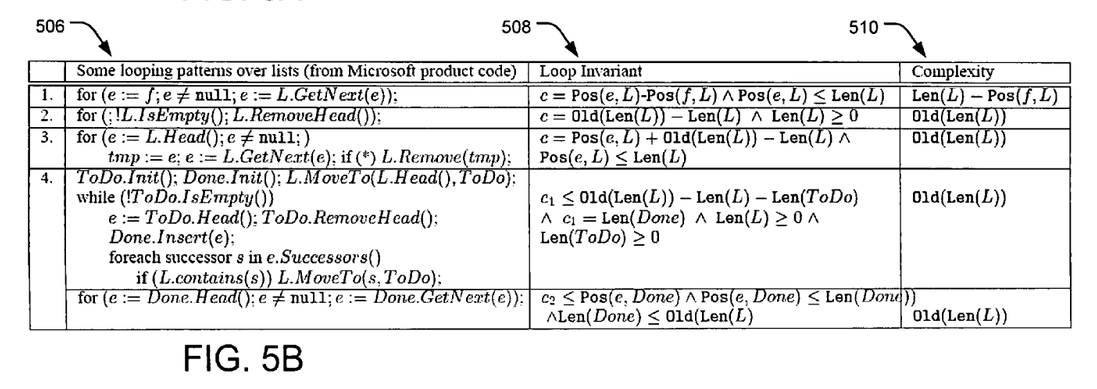
FIG. 5B presents a table showing a number of examples of looping patterns over lists from example code.

FIG. 5B shows some examples of looping patterns over lists taken from examples of Microsoft® product code. The first column of the table, column 506, lists the code strings of interest. The middle column of the table, column 508, lists the part of an inductive loop invariant generated by our invariant generation tool after instrumenting the loops with a single counter c. The last column of the table, column 510, lists the bounds computed from these invariants, where the bounds are computed after existential elimination of all temporary variables or variables that are modified in the program. Some of the invariants shown in the table at FIG. 5B use the term Old(t), which refers to the value of t at the beginning of the procedure. It is useful to create a copy of the quantitative functions of input data-structures at the beginning, since these functions might be destructively updated in the program.

The first example from the table at FIG. 5B iterates over a list starting from a list-element f in list L and following the next links. Example 2 from the table at FIG. 5B iterates over a list by deleting its head in each iteration. Example 3 from the table at FIG. 5B is more involved and combines list enumeration with destructive update of the list. Note that the inductive loop invariant is automatically discovered in this case.

Example 4 from the table at FIG. 5B is the most challenging example because the "while" loop iterates over a ToDo list whose length may decrease as well as increase in each loop iteration. In this example, elements are moved from the input list L to the ToDo list, which are then moved to a Done list. However, the order in which the vertices are moved to the Done list is the depth-first traversal order of the list-elements e, which are also graph nodes whose successors are given by the Successors( ) method. Bounding the loop iterations of the outer while loop begins by computing the non-trivial invariant $c_1 < 1 + Old(Len(L)) - Len(L) - Len(ToDo)$ using the invariant generation tool. Also, note that an upper bound on the number of loop iterations of the for-loop (after the while-loop) is the length of the Done list. However, this upper bound is computed in terms of the inputs by relating the length of the Done list in terms of the length of the input list L. This relationship is described as: $Len(Done) < Old(Len(L))$. This relationship is discovered by computing the loop invariant $Len(Done) < 1 + Old(Len(L)) - Len(L) - Len(ToDo)$ in the first loop, using the invariant generation tool.

This illustrates one example of an advantage of quantitative functions in the overall process. Quantitative functions are not only useful for expressing loop bounds, but are also useful to allow the invariant generation tool to relate numerical properties of different data-structures, which is important to express the loop bounds in terms of inputs.

Composite Data-Structures

Composite data-structures such as lists of lists, arrays of lists (hash tables) or n-ary trees, may have multiple quantitative attributes that can be associated with constituent data-structures. This is especially true when the quantitative attribute of a top-level data-structure may be a function of the quantitative attributes of the nested data-structures.

A challenge that arises in such situations is that updating a nested data-structure may not only affect the quantitative functions of the nested data-structure, but may also affect the quantitative functions of the top-level data-structure. To address this challenge, another function is defined at the level of a nested data-structure that maps the nested data structure to the top-level data-structure of which it is a part. One disadvantage of this approach is that it is not modular. However, this will normally not be a problem since the annotations are generally only provided at the data-structure level.

This methodology may be illustrated for some useful quantitative functions that can be associated with a list of lists, in addition to the functions Len and Pos defined earlier. Let L be any top-level list of elements e, where each element e is a list of nodes f. Several examples of useful quantitative functions may be defined as follows:

TotalNodes(L): Sum of length of all lists e', where e' is an element of L.

$TotalNodes(L) = Sum\{Len(e') | L.BelongsTo(e')\}$

MaxNodes(L): Maximum length of any list e', where e' is an element of L.

$MaxNodes(L) = Max\{Len(e') | L.BelongsTo(e')\}$

TotalPos(e, L): Sum of lengths of all lists e', where e' lies before e in L (i.e., if e belongs to L, otherwise it is don't care).

$TotalPos(e, L) = Sum\{Len(e') | L.BelongsTo(e') \wedge Pos(e', L) < Pos(e, L)\}$ Note that the quantitative attribute TotalNodes(L) of the top-level list L gets affected whenever any change is made to list e. In order to appropriately update TotalNodes(L) in such cases, a function Owner is used to map e to its top-level list L. This function can be defined as follows:

Owner(e): Top-level list L to which the nested list e belongs. (If e is not a nested list, then Owner(e) is don't care.)

FIG. 6 illustrates some list operations that update the functions just described. The first column, column 602, lists the operations, and the second column, column 604, describes the effects of the operations on the quantitative functions. Rows 1-5 in column 604 show how the functions are affected by some list operations when invoked over a list of lists. Row 6 in column 604 shows how the functions are affected by a Remove operation when invoked over a nested list.

Applicability of Quantitative Functions

The methodology of quantitative functions need not be restricted to recursive data-structures, but may also be applied to non-recursive data-structures like bit-vectors, which are often otherwise hard to reason about. Bit-vectors may have a few quantitative functions associated with them, e.g., total number of bits: Bits(a), total number of 1 bits: Ones(a), position of the least significant 1 bit: One (a), etc. Similarly, we can also define the quantitative functions Zeros(b), Zero(b), and LastZero(b). For simplicity, it is possible to assume that all bit-vectors have the same number of bits.

Figure 7:
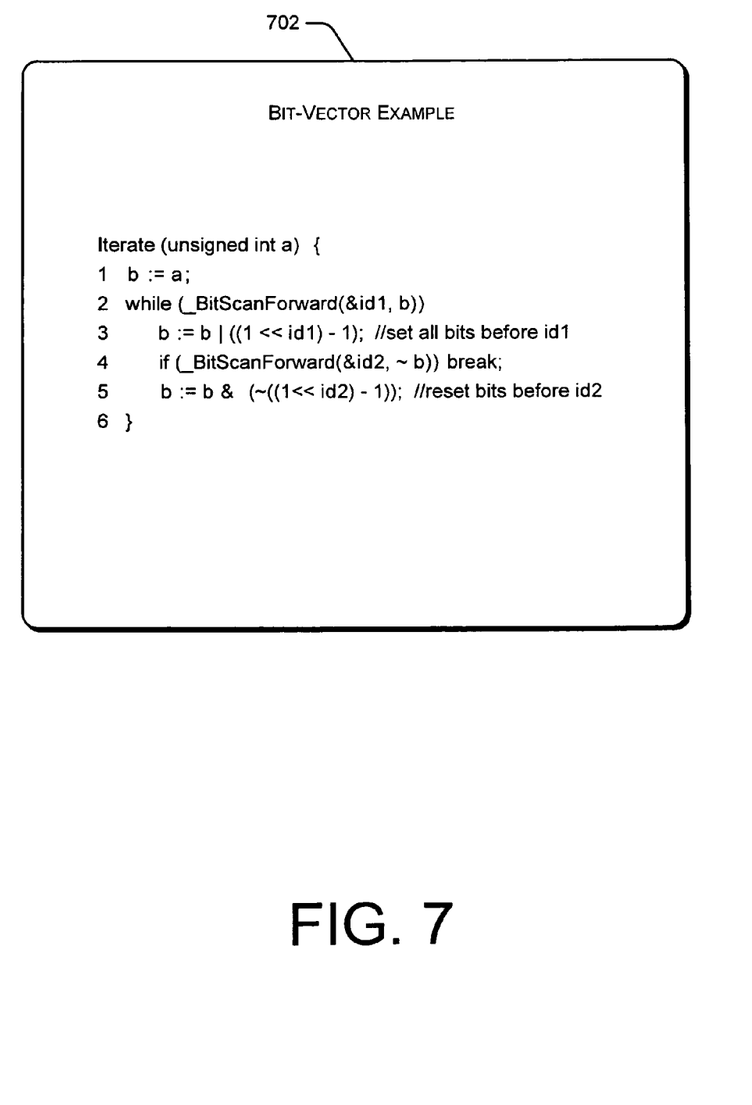
FIG. 7 illustrates an example of a procedure whose bound computation requires a quantitative function associated with a bit-vector.

FIG. 7 illustrates an example of a quantitative function associated with a bit-vector. Iterate, shown at 702, is an example of a code fragment that masks out the least significant consecutive chunk of 1s from b in each loop iteration. An invariant tool may be used to compute the inductive loop invariant: $2c<1+\text{One}(b)-\text{One}(a) \land c<1+\text{Ones}(a)-\text{Ones}(b)$, when the loop is instrumented with the counter variable c. This implies bounds of both Ones(a) as well as (Bits(a)−One (a))/2 on the total number of loop iterations.

Additionally, methodology of quantitative functions may be applied to data structures organized as trees. Quantitative functions that are useful to express and compute bounds on loops that iterate over trees include Height(T): Height of tree T; Nodes(T): Total number of nodes in tree T; Height (e, T): Height of node (or tree-element) e in tree T (i.e., if e belongs to T; otherwise it is don't care); and Nodes(e, T): Total number of nodes below e in tree T. (i.e., if e belongs to T; otherwise it is don't care).

Figure 8:
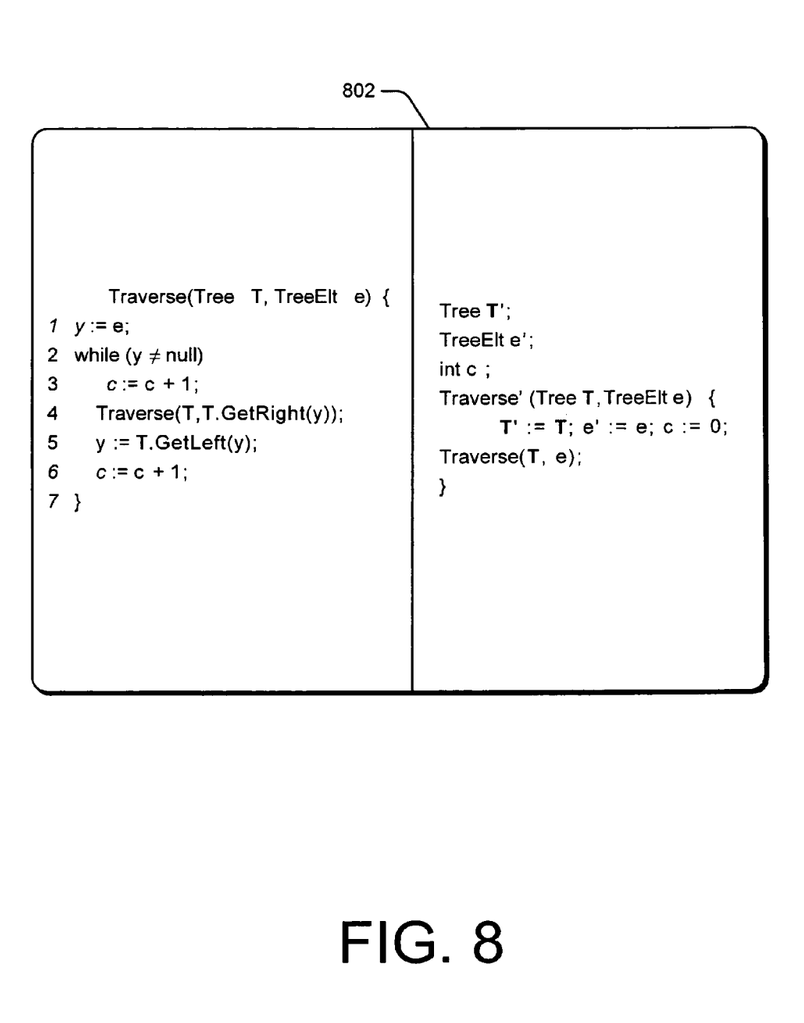
FIG. 8 illustrates an example of a procedure whose bound computation requires a quantitative function for trees.

FIG. 8 at 802 illustrates an example of a quantitative function for trees. The code for Traverse, shown at 802, shows an example of a recursive procedure that calls itself recursively inside a loop over trees, which is a recursive data-structure. Instrumentation as shown is part of an example of proof methodology for bounding the number of recursive procedure call invocations and loop iterations by way of introducing a global counter c.

Exemplary Methods

Exemplary methods for implementing calculation of resource bounds are described with reference to FIGS. 9-11. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 9:
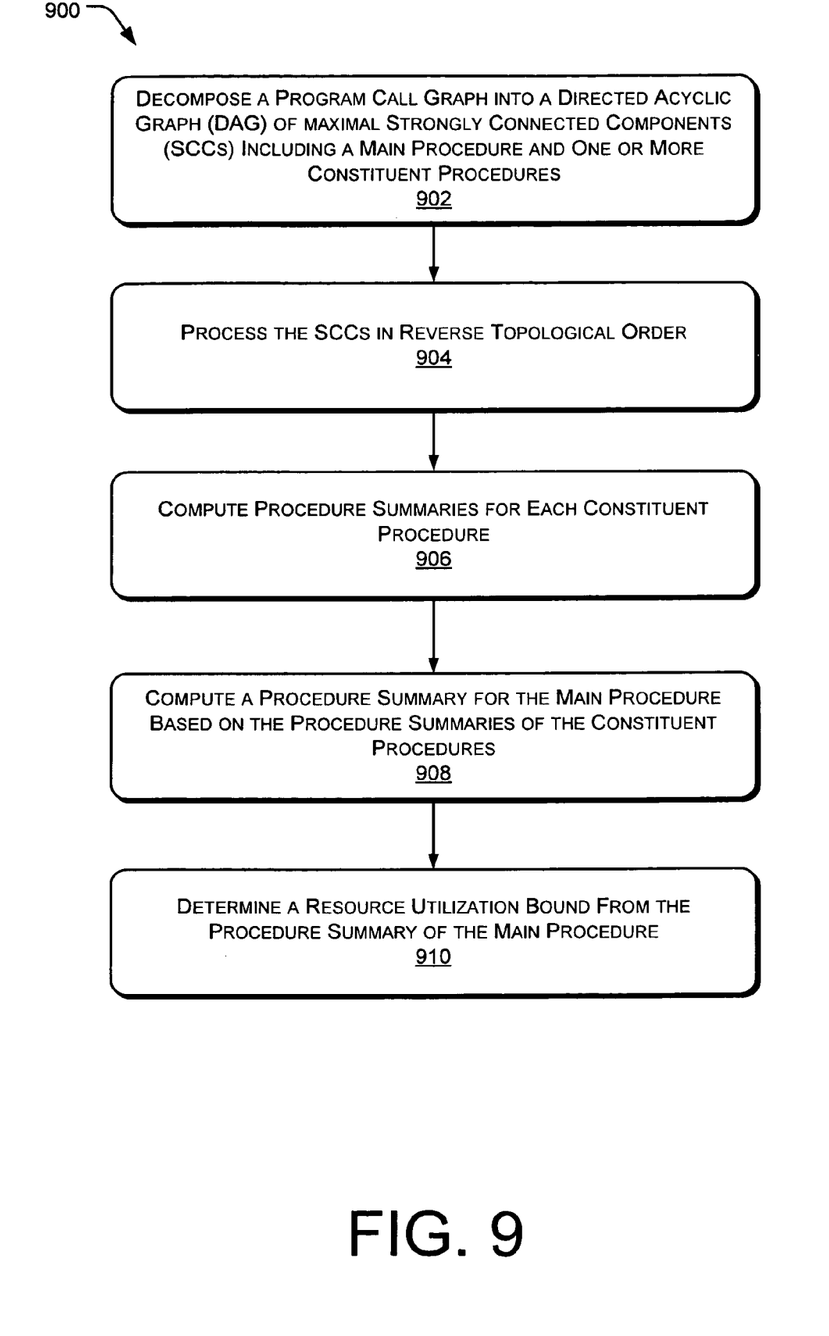
FIG. 9 illustrates an exemplary method of calculating resource bounds for a code based on computing resource bounds for each procedure, one by one, in the bottom up ordering of the call-graph.

FIG. 9 illustrates an exemplary method 900 of calculating resource bounds for a code based on computing resource bounds for each procedure, one by one, in the bottom up ordering of the call-graph.

At block 902, a program call graph is decomposed into a Directed Acyclic Graph (DAG) of maximal Strongly Connected Components (SCCs). The SCCs include a main procedure and one or more constituent procedures. At block 904, the SCCs are processed in reverse topological order, which includes computing procedure summaries for each constituent procedure, as shown at block 906. At block 908, a procedure summary for the main procedure is computed based on the procedure summaries of the constituent procedures. Then, at block 910, a resource utilization bound for the entire program code is determined from the procedure summary of the main procedure.

Figure 10:
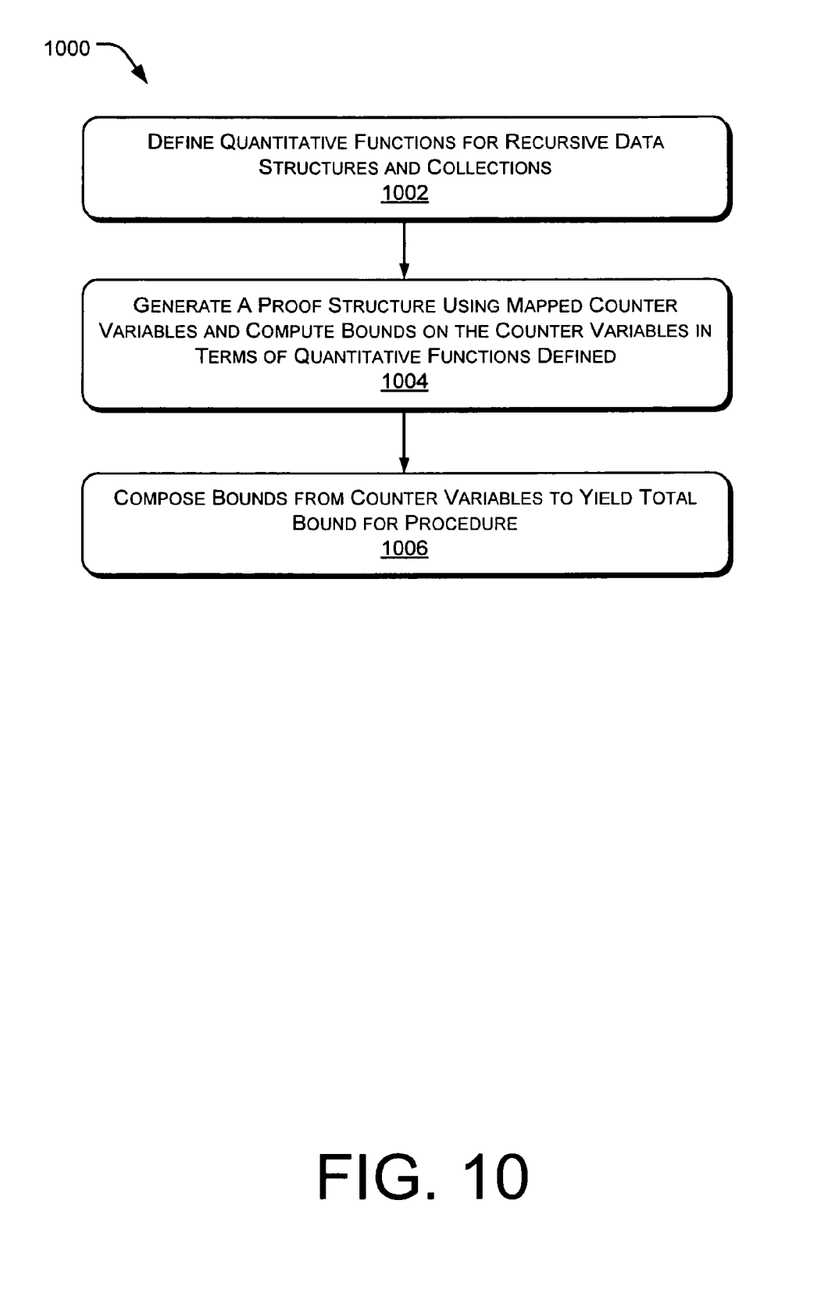
FIG. 10 illustrates a high-level overview of an exemplary method of calculating resource bounds in the presence of recursive data structures and collections.

FIG. 10 illustrates a high-level overview of an exemplary method 1000 for calculating resource bounds in the presence of recursive data structures and collections.

At block 1002, in one implementation, a user inputs data used to define quantitative functions for the recursive data structures and collections processed by the program code. In another implementation, the quantitative functions are automatically defined. The quantitative functions may be automatically defined using a prepared relational database, or a similar tool. The quantitative functions capture attribute information regarding the recursive data structures and collections, and map variables and/or nodes associated with the recursive data structures and collections to integers.

At block 1004, a proof structure is generated from an algorithm mapping each back edge of a recursive procedure call to a counter variable and computing bounds on each counter variable using a linear invariant generation tool that has support for handling uninterpreted functions, in terms of the quantitative functions defined for the abstract data-structures.

At block 1006, bounds for the counter variables are composed together to yield the total bound for the procedure.

FIG. 11 illustrates an exemplary method 1100 for calculating resource bounds in the presence of recursive data structures and collections using a proof structure.

At block 1102, in one implementation, a user inputs data used to define quantitative functions for the recursive data structures and collections processed by the program code. In another implementation, the quantitative functions are automatically defined. The quantitative functions capture attribute information regarding the recursive data structures and collections, and map variables and/or nodes associated with the recursive data structures and collections to integers. Once defined, the quantitative functions are instrumented into the program code.

At block 1104, multiple counter variables are introduced for instrumentation in the program code by the instrumentation module 116 according to one or more specified proof structures. Declaring one or more counter variables can include counting usage of resources during execution of one or more parts of the code. Additionally, the instrumentation module 116 instruments the counter variables to count the number of resources utilized during execution of the code.

At block 1106, the abstract interpreter 118 computes invariants for one or more parts in the code relating the instrumented counter variables with defined quantitative functions of recursive data structures and collections.

At block 1108, the abstract interpreter 118 calculates linear bounds on the counter variables from the invariants.

At block 1110, the bounds are composed together based on the proof structure to generate the resource bound for the entire program code.

Any of the acts of any of the methods described herein may be implemented at least partially by a processor or other electronic device based on instructions stored on one or more computer-readable media. Computer-readable media can be any available media that can be accessed during computation of resource bounds. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A computing device comprising:
   one or more processors;
   memory that includes a plurality of instructions executed by the one or more processors to perform acts comprising:
   identifying a tuple of an abstract data structure in a program code to associate with a quantitative function, the quantitative function being a numeric function over the tuple of the abstract data structure;
   specifying semantics of the quantitative function by describing an effect of one or more data-structure methods on the quantitative function; and
   computing a symbolic complexity bound for a number of loop iterations or a number of remote procedures calls executed for the abstract data structure based on the quantitative function using a linear invariant tool that treats the quantitative function as an uninterpreted function.

2. The computing device of claim 1, wherein describing the effect on the quantitative function includes describing how the quantitative function is updated upon execution of the one or more data structure methods associated with the data structure.

3. The computing device of claim 1, wherein the semantics are specified with programming syntax.

4. The computing device of claim 1, wherein the semantics include guarded assignments.

5. The computing device of claim 1, wherein the semantics include assume statements.

6. The computing device of claim 1, wherein the semantics include free variables.

7. The computing device of claim 1, wherein the quantitative functions are received as input from a user.

8. The computing device of claim 1, wherein the quantitative functions are generated by an automated process.

9. A computer-readable memory storing computer-executable instructions that, when executed, cause one or more processors to perform acts comprising:
   instrumenting an invocation of a call site of a data structure method associated with a data structure in a program code with semantics describing an effect on a quantitative function resulting from execution of the data structure method;
   introducing multiple counter variables in the program code based on a proof structure;
   computing invariants for obtaining bounds on resources consumed by the program code based on the semantics and the multiple counter variables;
   calculating linear bounds on the multiple counter variables from the invariants; and
   composing the linear bounds based on the proof structure to generate a resource bound for the program code.

10. The computer-readable memory of claim 9, wherein the instrumenting comprises describing the effect on the quantitative function in terms of at least one of an input or an output of the call of the data structure method.

11. The computer-readable memory of claim 9, wherein the instrumenting comprises substituting at least one of a formal input or a return parameter in the semantics with an actual value at the call site.

12. The computer-readable memory of claim 9, wherein the computing is performed by a linear invariant generation tool that supports uninterpreted functions.

13. The computer-readable memory of claim 9, further comprising instantiating an assignment of a free variable at a point in the program code with an expression that is live at the point in the program code.

14. The computer-readable memory of claim 9, further comprising instantiating an assignment of a free variable at a point in the program code with an expression that is present in an invariant immediately prior to the call site.

15. The computer-readable memory of claim 9, wherein the data structure includes a data collection.

16. The computer-readable memory of claim 9, wherein introducing multiple counter variables comprises:
    initializing one or more counter variables in the program code; and
    instrumenting iterative loops and recursive procedures with an increment of the counts of the counter variables based on a number of units of resources utilized during execution of the iterative loops and the recursive procedures.

17. A method of statically computing a bound on a resource utilized during execution of program code, the method comprising:
    under control of a computing system comprising one or more processors,
    defining a quantitative function, and instrumenting the quantitative function into the program code;
    introducing multiple counter variables into the program code based on a proof structure;
    selecting a location to initialize a counter variable to zero;
    selecting another location to increment the counter variable by one;
    computing an invariant relating the counter variables with the quantitative function;
    calculating one or more linear bounds based on the invariant and the counter variables; and
    composing the bounds on the counter variables, based on the proof structure, to obtain a final desired bound.

18. The method of claim 17, wherein the computing includes computing with a linear invariant generation tool that has support for handling uninterpreted functions.

19. The method of claim 17, wherein the calculating includes calculating each linear bound in terms of inputs of a corresponding procedure.

20. The method of claim 17, wherein the quantitative function is defined based at least in part on input received from a user.

* * * * *